(12) United States Patent
Harmer et al.

(10) Patent No.: US 7,228,299 B1
(45) Date of Patent: Jun. 5, 2007

(54) SYSTEM AND METHOD FOR PERFORMING FILE LOOKUPS BASED ON TAGS

(75) Inventors: Craig K. Harmer, San Francisco, CA (US); Sara Abraham, Sunnyvale, CA (US); Peter Vajgel, Menlo Park, CA (US)

(73) Assignee: VERITAS Operating Corporation, Mountain View, CA (US)

( * ) Notice: Subject to any disclaimer, the term of this patent is extended or adjusted under 35 U.S.C. 154(b) by 501 days.

(21) Appl. No.: 10/428,543

(22) Filed: May 2, 2003

(51) Int. Cl.
*G06F 17/30* (2006.01)
*G06F 7/00* (2006.01)

(52) U.S. Cl. .................. 707/3; 707/1; 707/102
(58) Field of Classification Search ............... None
See application file for complete search history.

(56) References Cited

U.S. PATENT DOCUMENTS

| | | | |
|---|---|---|---|
| 5,303,367 A * | 4/1994 | Leenstra et al. | 707/102 |
| 5,806,065 A * | 9/1998 | Lomet | 707/8 |
| 6,018,744 A * | 1/2000 | Mamiya et al. | 707/104.1 |
| 6,067,541 A * | 5/2000 | Raju et al. | 707/3 |
| 6,347,320 B1 * | 2/2002 | Christensen et al. | 707/102 |
| 6,360,215 B1 * | 3/2002 | Judd et al. | 707/3 |
| 6,582,474 B2 * | 6/2003 | LaMarca et al. | 715/500 |
| 6,704,739 B2 * | 3/2004 | Craft et al. | 707/102 |
| 2003/0084048 A1 * | 5/2003 | Dweck et al. | 707/10 |
| 2004/0044659 A1 * | 3/2004 | Judd et al. | 707/3 |
| 2004/0117354 A1 * | 6/2004 | Azzaro et al. | 707/3 |

OTHER PUBLICATIONS

Michael A. Olson, "The Design and Implementation of the Inversion File System," 1993 Winter USENIX, Jan. 25-29, 1993, (14 pages).
Murphy et al., "The Design and Implementation of the Database File System," Nov. 11, 2001, (9 pages).
Mark Russinovich, "Inside Win2K NTFS, Part 2," Windows IT Pro, 2000, (5 pages).

* cited by examiner

*Primary Examiner*—Charles Rones
*Assistant Examiner*—Alicia Lewis
(74) *Attorney, Agent, or Firm*—Robert C. Kowert; Meyertons, Hood, Kivlin, Kowert & Goetzel, P.c.

(57) ABSTRACT

A method for performing file lookups based on tags indicative of file characteristics may involve: a file system storing an association between a tag and a file, where the tag is indicative of a characteristic of the file; the file system storing an additional association between the tag and an additional file that also has the characteristic; the file system searching for files having the tag; and in response to searching, the file system returning identifiers of both files associated with the tag. The returned identifiers may include the files' pathnames or inode identifiers of the files' inodes.

20 Claims, 5 Drawing Sheets

SYSTEM AND METHOD FOR PERFORMING FILE LOOKUPS BASED ON TAGS

BACKGROUND

1. Field of the Invention

This invention relates to file systems and, more particularly, to locating files within a file system.

2. Description of the Related Art

File systems organize and manage information stored in a computer system. Typically, information is stored in the form of files. File systems may support the organization of user data by providing and tracking organizational structures such as folders and directories. The file system may interpret and access information physically stored in a variety of storage media, abstracting complexities associated with the tasks of locating, retrieving, and writing data to the storage media.

Files are typically located by specifying a path to that file. The path may indicate which directories or folders include that particular file. A typical path is a sequence of directory or folder names, starting at the file system's root directory, and ending with the name of the file or directory being identified.

SUMMARY

Various embodiments of systems and methods for performing file lookups based on tags indicative of file characteristics are disclosed. In one embodiment, a method may involve: a file system storing an association between a tag and a file, where the tag is indicative of a characteristic of the file; the file system storing an additional association between the tag and an additional file that also has the characteristic; the file system searching for files having the tag; and in response to searching, the file system returning an identifier (e.g., a pathname or inode identifier of the file's inode) of the file and an identifier of the additional file. In response to another query, the file system may also return all tags that are associated with the file.

The tags may be generated by an application. Each tag may be indicative of one or more of: the file size of the file, the file type of the file, the owner of the file, any of various contents of the file, and the handle used to identify each replicated copy of the file. Some files may not have a stored association with any tags. Associations may be created between any type of file (including directories, symbolic links, and other types of files) and a tag.

In some embodiments, the association between the tag and the file may be stored by storing the tag in an extended attribute of an inode for the file. Multiple tags may be stored in an extended attribute, and each of the tags may be indicative of a different characteristic of the file.

The file system may store the association between the tag and the file by storing the tag and an indication of the file in an entry in an index. The indication of the file may be an inode identifier of an inode associated with the file. The file system may store the additional association between the tag and the additional file by storing the tag and an indication of the additional file in an additional entry in the index. The file system may search for files having the tag by searching the index for entries that include the tag. Additional associations between additional tags and the file may each be stored in a different entry in the index. In one embodiment, the file system may maintain a different index for each of a several different applications that generate tags for files.

The file system may update the association between the file and the tag in response to the file being renamed or deleted. Additionally, the file system may verify the index in response to a system crash or loss of file system integrity caused by a media failure or another external event.

BRIEF DESCRIPTION OF THE DRAWINGS

A better understanding of the present invention can be obtained when the following detailed description is considered in conjunction with the following drawings, in which.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
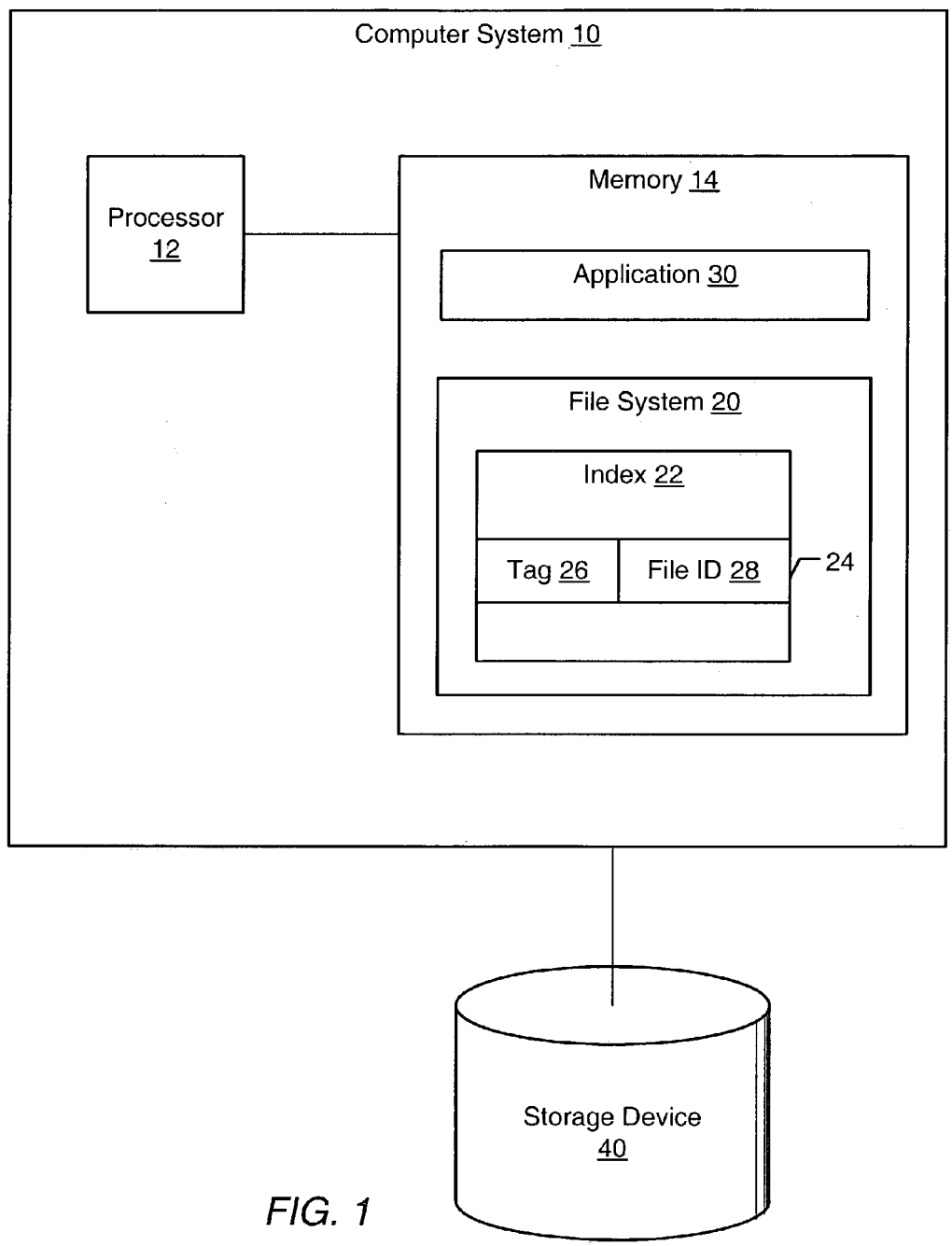
FIG. 1 illustrates a computer system that includes a file system configured to maintain associations between files and tags, according to one embodiment.

FIG. 1 shows a block diagram of a computer system 10 that includes a file system 20. In the illustrated embodiment, instructions and data implementing file system 20 are stored in memory 14 and executed by processor 12. File system 20 may be part of a distributed file system used to organize data accessed by various components of a networked computer system. In such embodiments, file system 20 may be executed on one system (e.g., a file server) and accessed by other systems (e.g., user workstations coupled to the file server by a local area network). In other embodiments, file system 20 may be implemented and used within a single computer system 10. In still other embodiments, file system 20 may be implemented as a clustered file system.

File system 20 manages data stored within storage device 40. Exemplary types of files that may be managed by file system 20 include regular files (e.g., text or binary data files), directory files (files which include other files and/or directories), executable files, symbolic links (files which point to other files), device special files (files which provide an interface to hardware), sockets (files which provide an interface to a network program), and named pipes (files which provide access to other programs). In some embodiments, storage device 40 may be coupled to computer system 10 by a SAN (Storage Area Network). In other embodiments, storage device 40 may be a network attached storage (NAS) device.

Storage device 40 may be a mass storage device, such as a hard disk, flash memory, CD-ROM (Compact Disc Read Only Memory), or DVD (Digital Versatile Disc) ROM. Storage device 40 may also include a combination of such devices. In some embodiments, storage device 40 may include one or more arrays of such storage devices. For example, storage device 40 may include a RAID (Redundant Array of Independent Disks) subsystem. Additionally, storage device 40 may include storage devices accessible to computer system 10 via a network such as a LAN (Local Area Network) or SAN (Storage Area Network). Storage device 40 may be an object-based storage device (OBSD) or support hash-addressable storage (a device in which a block of data is identified by a unique hash of the contents of the block) in some embodiments.

File system 20 includes an index 22 that includes one or more entries 24. Each entry 24 stores an association between a tag 26 and a file (e.g., by storing an identifier 28, such as the file's pathname or inode identifier, associated with that file). Multiple different tags may be associated with the same file, and the same tag may be associated with multiple different files. Some files within the file system may not be associated with any tags. Each tag may indicate a file characteristic such as file size, file type (e.g., JPEG, MPEG, DOC, etc.), file owner, a handle used to identify each replicated copy of the file, etc. Tags may also indicate access characteristics of files. For example, an access characteristic of a file may indicate the time at which the file was most recently read, the time at which the file was most recently written, an I/O pattern used to access the file, and/or which application(s) have accessed the file. In some embodiments, file system 20 may maintain multiple indexes 22, as described in more detail below with respect to FIG. 1A.

The file system 20 may implement the index 22 in various ways. For example, in one embodiment, the file system 20 may implement the index 22 as a sorted list. In other embodiments, the file system 20 may implement the index 22 as a multi-way tree (which may also be referred to as a b-tree). In still other embodiments, the index 22 may be implemented as a hashed array.

Instructions and data implementing one or more application programs 30 may also be stored in memory 14 and executed by processor 12. Application 30 may generate tags for storage in index 22 by file system 20 for various files. Each tag may have a value, such as a number and/or string, that can be compared to values in other tags. Each application 30 that generates tags may assign its own semantic meaning to tag values, independent of other applications and of the file system 20. For example, one application may assign a tag value of 27 to each file that application wants to identify as a JPEG file. Another application may use a tag value of 35 to identify JPEG files. Tags may have arbitrary values and/or sizes, and a tag value generated by one application 30 may not have any meaning for any other application or the file system in some embodiments. In one embodiment, each tag may have a maximum size of 64 bits. Other tag sizes may be supported in other embodiments.

An application 30 may search for files having a given characteristic by querying the file system 20 for files having the tag associated with that characteristic. In response to the query, the file system 20 may search the index 22 for associations linking that tag to a file. The file system 20 may return the identifier (e.g., the pathname or inode ID) of each file for which an association with the tag is found in the index 22 to the requesting application 30.

Applications 30 may generate tags 26 for files in response to creating and/or accessing those files. Additionally, in some embodiments, the file system 20 may maintain a change log indicative of changes to files within the file system within a recent period. An application 30 may use information in the change log when generating tags. For example, an application 30 may access the change log to determine which files have been created since the application last generated tags for files. In response to finding new files in the change log, the application may assign one or more tags to each newly created file.

An application 30 may search for files having multiple attributes by searching for files associated with multiple tags. For example, if the application 30 generated one tag indicating a particular owner and another tag indicating a particular file type, the application may query the file system 20 for files associated with each of the two tags in order to locate which files have that particular owner and which files are of that particular file type. For each query, the file system 20 may return file identifiers (e.g., pathnames, inode IDs) of the files for which an association with the respective tag is found. The application may then determine which files, if any, satisfied both queries. If additional processing is desired on the file identifiers (e.g., to produce the files' pathname(s) from the files' inode IDs), the matching subset of file identifiers for files that satisfied both queries may then be additionally processed (e.g., by a reverse pathname lookup mechanism, as described below).

Alternatively, the application 30 may generate tags that indicate multiple attributes. For example, one tag may indicate both a file type and an owner. In such a situation, the application 30 may search for files having multiple characteristics by searching for files having a single tag. In some embodiments in which tags indicate multiple characteristics, searches for files having a single characteristic may involve searching for files having a tag in which a portion of the tag has a particular value.

The file system 20 may ensure that the index 22 is current with regard to the state of each tag and each file for which an association is maintained in the index. For example, if a file is deleted, the file system 20 may search the index 22 for associations linking any tags to that file and remove any matching associations. Similarly, if a file is moved or renamed in such a way that an association would be affected, the file system 20 may update the index 22 as needed to ensure that each association with the moved or renamed file remains correct. Additionally, if activity such as a system crash occurs or if a loss of file system integrity is caused by a media failure or another external event, the file system 20 may be configured to verify the index 22 to ensure that the index 22 is still valid. Accordingly, the file system's maintenance of the index 22 may provide referential integrity of the associations within the index, by continuously maintaining referential integrity and/or by repairing the index to restore referential integrity.

Figure 1A:
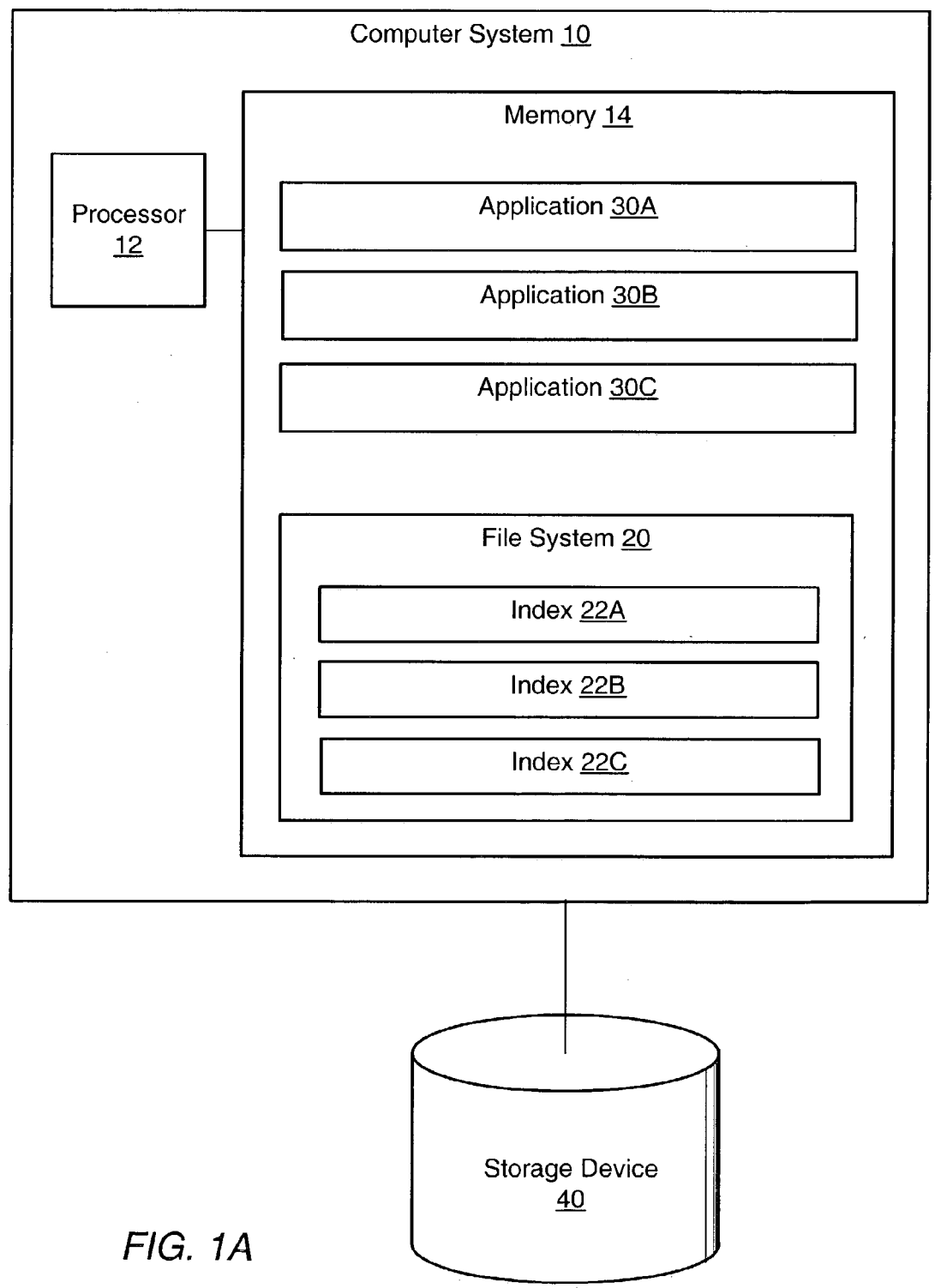
FIG. 1A illustrates a computer system that includes a file system configured to maintain associations between files and tags generated by multiple different applications, according to one embodiment.

Multiple applications 30 may each generate tags for files, as shown in FIG. 1A. Here, three applications 30A-30C (collectively, applications 30) generate tags. Because tag values may be assigned arbitrarily be applications 30, there exists the possibility that two applications may use the same tag value to indicate different file characteristics. As a result, when one of the applications searches for the characteristic that application associates with the tag value, the file system may return files that were assigned the same tag value by the other application. These files may not have the characteristic desired by the searching application.

In the example of FIG. 1A, the file system 20 maintains a different index 22A-22C for each application 30A-30C that may generate tags in order to reduce problems that may occur when two applications use the same tag value to describe different characteristics. Whenever application 30A generates a tag for a file, file system 20 may store the association between the tag and the file in index 22A. Similarly, when applications 30B and 30C generate tags for files, file system 20 may store the associations in indexes 22B and 22C respectively.

Whenever application 30A searches for files having a given tag, the file system 20 may search the index 22A associated with that application 30A for the tag value. Even though other indexes 22B and 22C may contain entries storing the same tag value, the file system 20 may not search these indexes for the tag value, since the tag value may represent a different characteristic when generated by the other applications 30B and 30C. Accordingly, each time a particular application 30A queries the file system 20 for files having a particular tag, the file system 20 may only return pathnames to files for which an association with the tag was created by the querying application 30A. This may allow each application 30 the flexibility to generate tags within the entire range or set of possible tag values while reducing the possibility of problems occurring due to multiple applications using the same tag value to represent different file characteristics.

In alternative embodiments, the file system 20 may allocate ranges or subsets of tag values to each application 30 that may generate tags in order to avoid problems that may arise when two different applications use the same tag value to describe a different file characteristic. Each application may only generate tags within that application's assigned range or subset. In such embodiments, the file system 20 may store associations between files and tags generated by all of the applications in the same index. Note that in still other embodiments, it may be unlikely that different applications will generate the same tag to describe a different characteristic. In such embodiments, the file system 20 may maintain a single index 22 and all applications may be allowed to generate tags within the entire range or set of possible tag values.

Figure 1B:
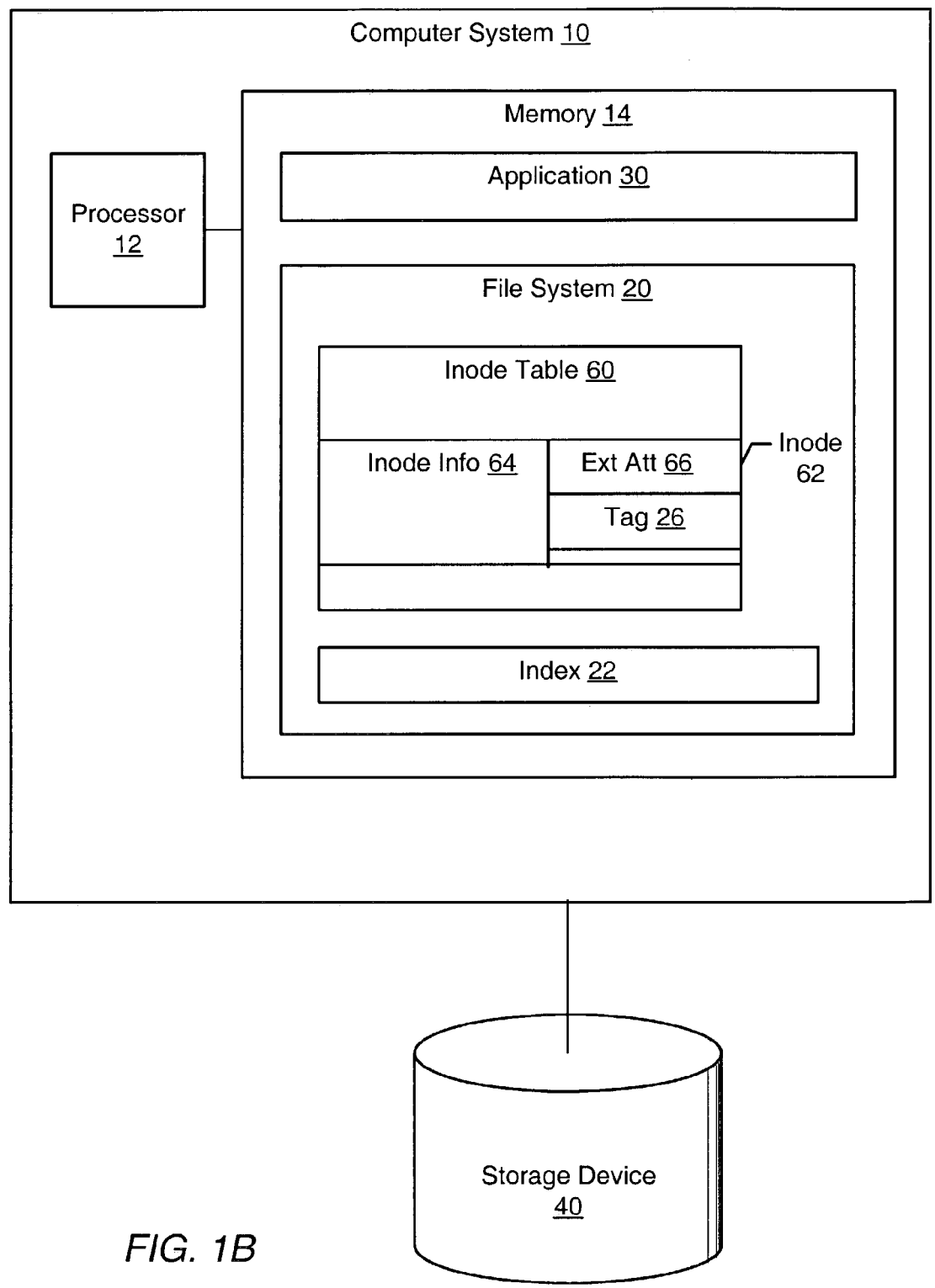
FIG. 1B illustrates a computer system that includes a file system configured to maintain associations between files and tags, according to another embodiment.

FIG. 1B illustrates yet another embodiment of a computer system 10. As in the above embodiments, the file system 20 associates tags with files by storing the tag and an identifier associated with the file in an entry in an index 22. Additionally, file system 20 includes an inode table 60, illustrated with an exemplary inode 62. An inode 62 may include the information 64 indicating the physical location of its associated file data. This information 64 may include one or more pointers to the blocks within storage device 40 that store the data making up the file represented by the inode 62 as well as other metadata, which may indicate permissions, file type, owner and/or group information, file size, and/or file modification date and time for the associated file. Note that as used herein, the term "inode" describes any structure that stores file metadata identifying the location of the file's data within a storage device 40. For example, a location may be identified by the object name of one or more storage objects in an OBSD or a unique hash of the contents of a block of storage in a hash-addressable storage device. Other names often used to describe such structures include file nodes, file reference numbers, file control blocks, file table entries, and snodes. In some types of file systems, an inode table is described as a master file table.

In some embodiments, the file system 20 may store the tags associated with a particular file in an extended attribute 66 of that file's inode 62. If multiple indexes are in use, as shown in FIG. 1A, the file system 20 may also store an indication in an extended attribute that indicates which index includes the file's association with the tag. Each extended attribute 66 may be implemented as an array of one or more fixed-size entries. Whenever the file system 20 stores or removes a tag in an extended attribute 66, the file system 20 may also update the index 22. If the file system 20 provides an interface that allows an application 30 to initiate a query for all of the tags associated with a particular file, the file system 20 may respond to such a query by retrieving the tag(s) stored in an extended attribute 66 of the file's inode. Note that in some embodiments, inodes may have multiple extended attributes.

Note that in alternative embodiments, the file system 20 may not store tags associated with a given file in an extended attribute of that file's inode 62. In such embodiments, the file system may respond to a query for all of the tags associated with a particular file by searching the index 22 for associations with that file and returning all of the tags for which an association with that file is found. In yet other embodiments, a separate index, indexed by inode ID instead of tag, may be used to maintain associations between inode IDs and tags. Each entry in such an index may include a list of tags associated with a respective inode.

Figure 2:
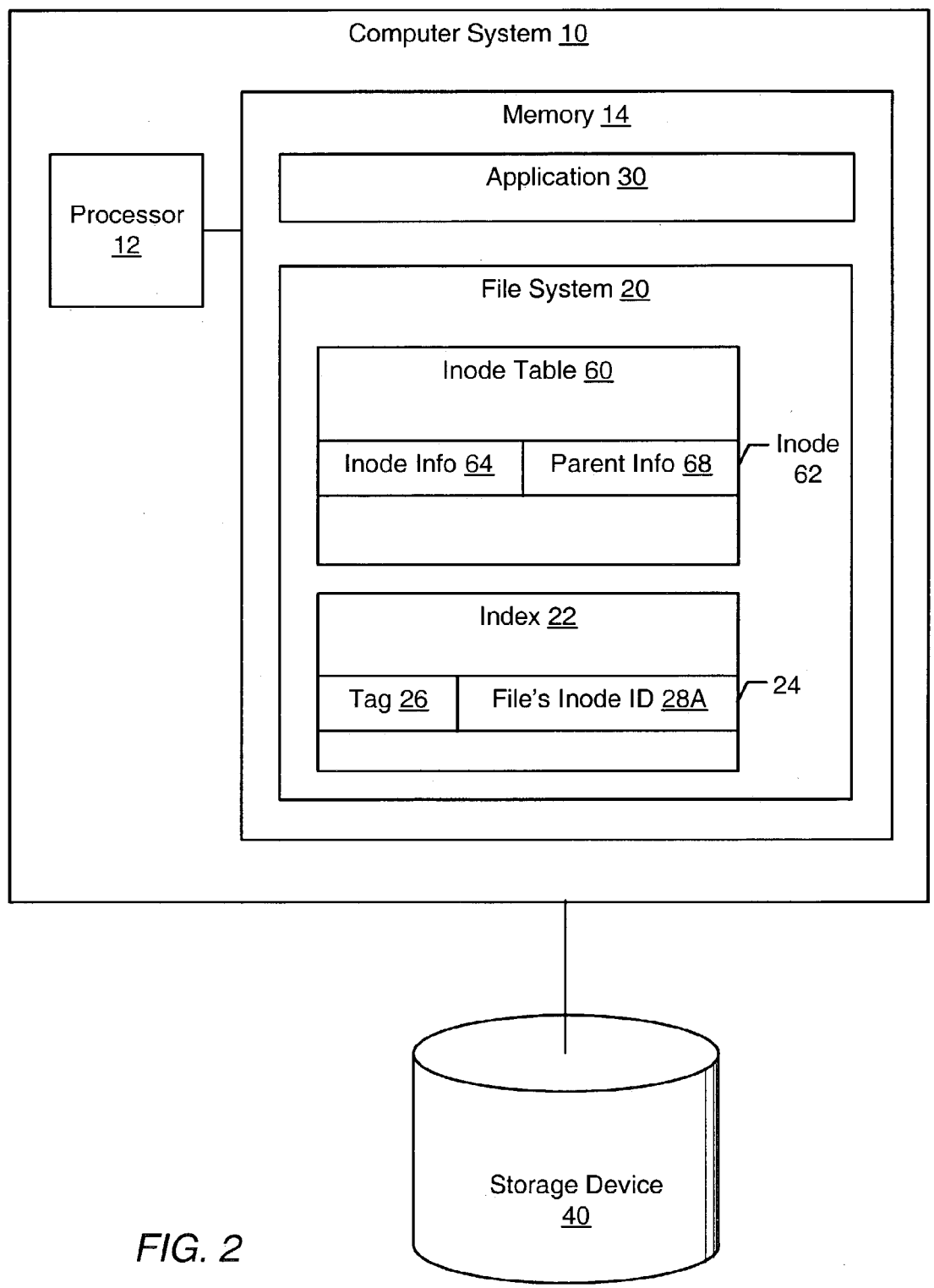
FIG. 2 illustrates a computer system that includes a file system configured to maintain associations between files and tags and to perform reverse pathname lookups, according to one embodiment.

FIG. 2 illustrates how, in some embodiments, the file system 20 may create an association for storage in index 22 by storing the tag 26 and the inode identifier 28A of the file with which the tag 26 is being associated in an entry 24. Generally, each inode 62 within inode table 60 is identified by a unique inode identifier 28A. Inodes are commonly identified by an inode number or position within the inode table. Given an inode identifier 28A, the file system 20 may directly access the identified inode 62 in inode table 60.

The pathname of each file managed by file system 20 may be associated with the inode identifier 28A of that file's associated inode 62. Multiple pathnames may be associated with the same inode identifier 28A. One mechanism for associating inode identifiers with filenames is provided by directory files. Directory files typically store the filename and inode identifier of each file (including other directory files) included in that directory.

Since multiple pathnames may be associated with the same inode identifier 28A (e.g., if there are multiple links to the same file), maintaining associations between tags and files by using inode identifiers 28A may simplify maintenance relative to embodiments in which associations use other file identifiers 28 such as pathnames or filenames. For example, when entries 24 in the index 22 store inode identifiers 28A, file renaming and the creation of additional links to a file may not result in an update to the index, since these actions may not affect the identity of the inode for the associated file. In alternative embodiments, the file system 20 may store the tag 26 and the filename or pathname of the file with which the tag is being associated in each entry 24. In these embodiments, file renaming and the creation of links to files may result in the file system 20 updating the index 22.

Whenever the file system searches the index 22 for the tag 26, the file system 20 may use the inode identifier 28A found in each matching entry 24 that stores the tag 26 to generate a pathname of the file associated with the identified inode. In the embodiment of FIG. 2, the file system 20 is configured to perform reverse pathname lookups from inode identifiers. In order to perform a reverse pathname lookup operation to identify a pathname to a file based on that file's inode identifier, file system 20 may store additional information in a file's inode. As shown in FIG. 2, an inode 62 may also include the parent information 68 that includes the inode identifier of the associated file's parent directory. Since each directory includes the filename and inode identifier of each file included within that directory, having the inode identifier of the file's parent directory allows a reverse pathname lookup routine included in the file system 20 to quickly identify which directory to search for the file's filename without having to access each directory managed by the file system. After retrieving the inode identifier of the file's parent directory (or directories, in some cases) from the file's inode, the reverse pathname lookup may be performed by searching the identified directory for the file's inode identifier in order to retrieve the file's filename.

Since the file's parent directory may itself be a subdirectory of another directory, several directories may need to be accessed in order to generate the entire pathname during a reverse pathname lookup. In many embodiments, information about the file's parent directory's parent directory, if any, may be included in the file's parent directory. For example, in UNIX systems, a directory file includes two entries: '.' (dot) and '..' (dotdot). The first entry, dot, identifies the inode of the directory itself. The second entry, dotdot, identifies the inode for the parent directory of that directory (except in the root directory, where the two entries are equal). Thus, the file system 20 may generate the remaining portion of the file's pathname by accessing the parent directory to find the inode identifier of that directory's parent directory, if any, accessing the directory's parent directory to determine the directory's name, and so on until the root directory is reached. Note that in some embodiments, a directory file's inode may include a parent directory inode identifier, allowing a reverse pathname lookup for the directory to be performed without having to open the directory file itself. However, in other embodiments, only inodes for non-directory files may include parent directory inode identifiers. In embodiments in which multiple links are supported, a file's inode 62 may include multiple parent directory inode identifiers in parent information 68. An inode 62's parent information 68 may also indicate the current number of links to the associated file if it is desired to be able to return all pathnames to the file.

In embodiments such as the one illustrated in FIG. 2, the file system 20 may verify the index 22 (e.g., in response to a system crash) by creating an array of bits in memory such that the array includes one bit per entry 24 in the index 22. Each bit in the array may initially be set to the same value. For example, each bit may initially be zeroed. The file system 20 may walk through a list of inodes. Each time a tag is found in an inode's extended attribute, the file system may search the index 22 for a corresponding entry 24 linking that tag to the file associated with the inode. If a corresponding entry is found in the index, the file system 20 may set the corresponding bit in the array to a new value (e.g., one). If a corresponding entry is not found in the index 22, the file system 20 may determine that the index 22 is corrupt. Once the file system 20 has walked through the entire list of inodes, all of the bits in the array should have the new value. If any of the bits in the array do not have the same value, the file system 20 may determine that the index 22 is corrupt.

In one embodiment, the file system 20 may include several interfaces that allow an application 30 to set and remove associations between a file and a tag. The file system 20 may also include several interfaces that allow an application 30 to search for all of the tags associated with a given file and for all of the files associated with a given tag. Several exemplary interfaces are provided below. Note that other embodiments may use other interfaces.

One file system interface may be used by an application that wants to associate a tag with a file. This interface may receive a file descriptor of the file and the value of the tag from the application and responsively store the association between the file and the tag in the index (e.g., by storing the tag and an identifier of the file in an entry in an index 22). The file system may also store the tag with the file (e.g., by storing the tag in an extended attribute 66 of the file's inode 62, as shown in FIG. 1B). A file descriptor may be generated by a file system interface used to open the file via a pathname, filename, or inode ID and used by the opening application to refer to the open file. In embodiments where the file system maintains multiple indexes, this interface may also receive an indication of the index (e.g., the inode identifier of the index's inode) into which the association should be stored from the application.

Another file system interface may remove the association between a file and a tag. This interface may receive a file descriptor of the file and the value of the tag from an application. In response to receiving the file descriptor and the tag via this interface, the file system 20 may remove the index entry 24 that contains the tag having the specified value and indicates the specified file. The file system 20 may also remove the tag having the specified value from an extended attribute of the specified file's inode. In embodiments where the file system maintains multiple indexes, this interface may also receive from the application an indication of the index from which the association should be removed.

Yet another file system interface may allow an application to find out which tags are associated with a given file. The application may provide this interface with a file descriptor, an array in which the tag(s) associated with that file may be stored by the file system, and an integer indicating the maximum number of tags the file system should return. In response to receiving this information via the interface, the file system 20 may retrieve the tags from the extended attribute 66 of the file's inode 62. The file system may store all of the retrieved tags associated with the specified file in the specified array. The file system 20 may also return a value indicating the number of tags found for the file. If no tags are associated with the specified file, the file system 20 may return a value of zero. Note that in alternative embodiments, the file system 20 may respond to receiving information via this interface by searching for associations with the specified file in the index 22 and returning all of the tags for which an association with the specified file is found in the index.

Another file system interface may allow an application to find out which files are associated with a given tag. This interface may receive a tag value of a tag from an application, as well as a buffer in which to store identifiers of any files that are found to be associated with that tag. In response to receiving information via this interface, the file system 20 may search an appropriate index 22 for entries 24 containing the specified tag. The file system may return file identifiers (e.g., inode identifiers, filenames, and/or pathnames) of any files for which an association with the specified tag is found in an index entry in the buffer. For example, the file system 20 may retrieve inode identifiers found in index entries that include the specified tag and input those inode identifiers into a reverse pathname lookup interface. The file system 20 may then return the pathnames provided by the reverse pathname lookup interface to the application.

Figure 3:
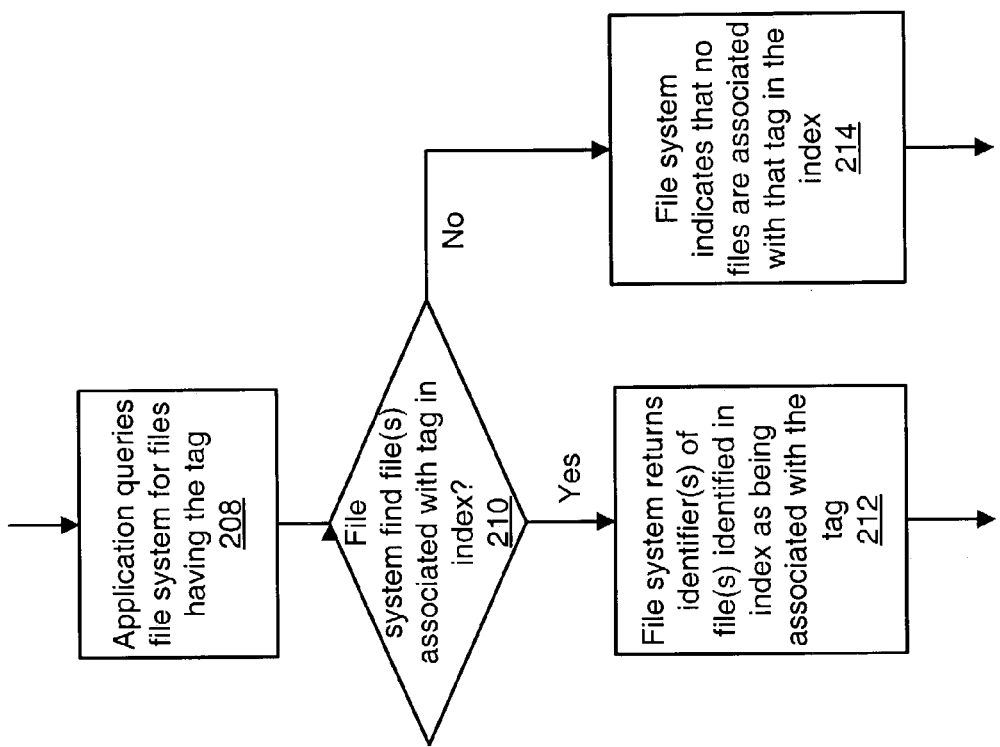
FIG. 3 is a flowchart of one embodiment of a method of maintaining associations between files and tags.
Figure 3:
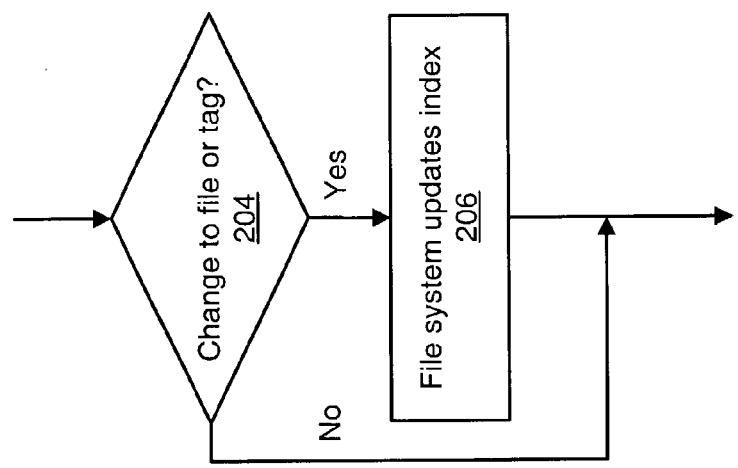
Figure 3:
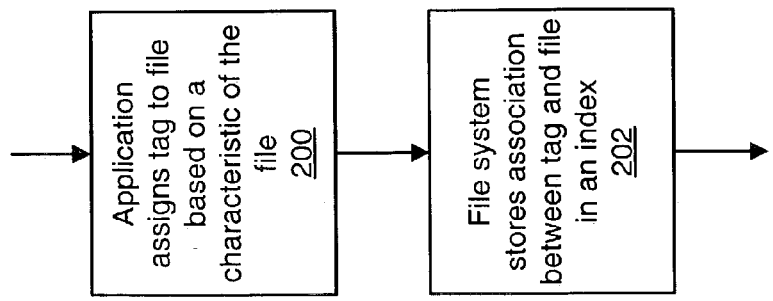

FIG. 3 illustrates one embodiment of a method of performing file lookups by tag and of maintaining associations between tags with files. At 200, an application assigns a tag to a file based on a characteristic of the file. The value of the tag may indicate a characteristic of the file to the application. The application may assign the tag to the file in response to finding the file identified in a log of changed files maintained by the file system. The application may assign the tag to the file by accessing a file system interface. If multiple indexes are maintained by the file system, the application may also identify to the file system the index in which the association between the file and the tag should be stored.

In response to the application assigning the tag to the file, the file system stores an association between the tag and the file in an index, as shown at 202. The file system may store the association by storing the tag and an indication of the file (e.g., an inode identifier of the file's inode) in an entry in an index. If the file system maintains multiple indexes, the file system may select the index in which to store the association based on which application assigns the tag to the file.

If a change to the file or the tag is detected at 204, the file system may update the index to reflect the change, as indicated at 206. For example, if a file is removed, the file system may remove any index entries that associate a tag with that file. Similarly, if an application removes a tag from a file, the file system may remove an index entry associating that tag to that file and remove the tag from an extended attribute of the file's inode. If the file is renamed and the association is formed by storing the file's filename and tag in an index entry, the file system may update the file's filename in the entry. If links to the file are created, the file system may add additional index entries to associate each additional one of the file's filename to the tag.

If the application queries the file system for files having the tag (e.g., because the application is searching for files having a characteristic indicated by the tag) at 208, the file system may search the index for entries associating the tag with a file. The file system may return pathnames to each file for which an association with the tag is found in the index, as indicated at 210-212. Returning a file's pathname may involve retrieving the inode identifier of the file's inode from an index entry and performing a reverse pathname lookup using that inode identifier to generate the file's pathname. If no associations in the index associate the tag to a file, the file system may return an indication that no files are associated with that tag to the application, as shown at 210 and 214.

Returning to FIG. 1, note that computer system 10 may take various forms, including a workstation, server, mainframe computer system, network appliance, network computer, Internet appliance, personal digital assistant (PDA), embedded device, smart phone, television system, another suitable device, or combinations thereof.

Additionally, note that all or part of a file system application 20 may be stored on various computer accessible media such as memory 14. Examples of computer accessible media include hard disk storage, floppy disk storage, removable disk storage, flash memory, punch cards, magnetic core, and random access memory (RAM). Computer accessible media may include an installation medium, e.g., a CD-ROM or floppy disk. In addition, a computer accessible medium may be included in one computer system that provides the program instructions over a network to another computer system for execution. Thus, various embodiments may further include receiving, sending or storing instructions and/or data implemented in accordance with the foregoing description upon a computer accessible medium. A computer accessible medium may include a communication medium such as network and/or a wireless link on which communication signals such as electrical, electromagnetic, optical, or digital signals are conveyed.

The flow charts described herein represent exemplary embodiments of methods. The methods may be implemented in software, hardware, or a combination thereof. The order of the method may be changed, and various elements may be added, reordered, combined, omitted, modified, etc.

Various modifications and changes may be made to the invention as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A computer-implemented method, comprising:
   a file system storing an association between a tag and a file included within the file system, wherein the tag is indicative of a characteristic of the file, wherein the association is stored in a data structure that indicates an inode identifier of an inode stored by the file system for the file, wherein the inode comprises a pointer to one or more blocks of physical storage in which data of the file is stored;
   the file system storing an additional association between the tag and an additional file included within the file system, wherein the additional file also has the characteristic;
   the file system searching for and identifying files having the tag;
   in response to said searching for and identifying, the file system returning an identifier of the file and an identifier of the additional file.

2. The method of claim 1, further comprising an application generating the tag to indicate one or more of: a file size of the file, a file type of the file, an owner of the file, contents of the file, an access characteristic of the file, and a handle used to identify each replicated copy of the file.

3. The method of claim 1, wherein said storing the association between the tag and the file comprises storing the tag in an extended attribute of the inode, wherein the extended attribute comprises an array of one or more entries stored in an inode table by the file system, wherein the inode table includes the inode.

4. The method of claim 3, further comprising storing each of a plurality of tags in the extended attribute, wherein each of the plurality of tags is indicative of a different characteristic of the file.

5. The method of claim 1, wherein at least one file within the file system does not have a stored association with any tags.

6. The method of claim 1, further comprising:
   in response to a query, the file system returning all tags for which an association with the file is stored.

7. The method of claim 1, wherein the data structure comprises an index, the method further comprising:
   the file system storing the association between the tag and the file by storing the tag and the inode identifier in an entry in the index;
   the file system storing the additional association between the tag and the additional file by storing the tag and an additional inode identifier of an additional inode associated with the additional file in an additional entry in the index;

wherein said searching comprises the file system searching the index for entries that include the tag.

8. The method of claim 7, further comprising:
the file system storing another association between a different tag and the file by storing the different tag and the inode identifier in a different entry in the index than the entry containing the tag and the inode identifier of the file, wherein the different tag is indicative of a different characteristic of the file.

9. The method of claim 1, wherein the identifier of the file is a pathname of the file.

10. The method of claim 1, further comprising the file system maintaining a different index for each of a plurality of applications that generate tags for files, wherein each different index stores associations between files and tags generated by a respective one of the plurality of applications.

11. The method of claim 1, further comprising the file system updating the association between the file and the tag in response to the file being renamed or deleted.

12. The method of claim 1, further comprising:
the file system storing each of a plurality of associations between a file and a tag in a respective entry in an index; and
the file system verifying the index in response to a system crash.

13. The method of claim 1, further comprising:
an application generating the tag in response to the file having the characteristic;
the application providing the tag and an indication of the file to the file system via a file system interface; and
the file system storing the association between the file and the tag in response to receiving the tag and the indication of the file via the file system interface.

14. The method of claim 13, further comprising the application accessing a file change log and responsively generating one or more tags for each of a plurality of files included in the file change log.

15. A system, comprising:
a processor; and
a memory coupled to the processor and storing program instructions executable by the processor to implement a file system, wherein the file system maintains an index comprising:
a plurality of entries, wherein each entry of the plurality of entries stores an indication of a file and a tag indicative of a characteristic of the file, wherein the indication of the file comprises an inode identifier of an inode stored by the file system for the file, wherein the inode comprises a pointer to one or more blocks of physical storage in which data of the file is stored;
wherein the file system is configured to search the index for each entry storing the tag and, in response to identifying an entry storing the tag, to return an identifier of a respective file indicated in each entry storing the tag;
wherein more than one of the plurality of entries store the tag, and wherein an indication of a different file is stored in at least some of the more than one of the plurality of entries that store the tag.

16. The system of claim 15, wherein the memory is configured to store additional program instructions executable by the processor to implement an application, wherein the application is configured to generate the tag to indicate one or more of: a file size of the file, a file type of the file, an owner of the file, contents of the file, an access characteristic of the file, and a handle used to identify each replicated copy of the file.

17. The system of claim 15, wherein in response to a query from an application, the file system is configured to return all tags associated with a particular file.

18. A tangible, computer accessible storage medium storing program instructions implementing a file system, wherein the program instructions implementing the file system are computer executable to:
store an association between a tag and a file included within the file system, wherein the tag is indicative of a characteristic of the file, wherein the association is stored in a data structure that indicates an inode identifier of an inode stored by the file system for the file, wherein the inode comprises a pointer to one or more blocks of physical storage in which data of the file is stored;
store an additional association between the tag and an additional file included within the file system, wherein the additional file also has the characteristic;
search for and identify files having the tag;
in response to searching for and identifying files having the tag, return an identifier of the file and an identifier of the additional file.

19. A computer-implemented method, comprising:
a file system storing an association between a tag and a file included within the file system, wherein the tag is indicative of a characteristic of the file, wherein the association is stored in a data structure that indicates an inode identifier of an inode stored by the file system for the file, wherein the inode comprises a pointer to one or more blocks of physical storage in which data of the file is stored;
the file system storing an additional association between an additional tag and the file, wherein the additional tag is indicative of an additional characteristic of the file;
the file system returning an identifier of the file in response to searching for and identifying files having the tag;
the file system returning an identifier of the file in response to searching for and identifying files having the additional tag.

20. The method of claim 19, further comprising:
the file system storing an additional association between the tag and an additional file included within the file system, wherein the additional file also has the characteristic;
wherein the file system returns an identifier of the file and an identifier of the additional file in response to searching for and identifying files having the tag.

* * * * *